(12) United States Patent
Campos Macias et al.

(10) Patent No.: US 10,733,896 B2
(45) Date of Patent: Aug. 4, 2020

(54) PROJECTION-BASED COOPERATIVE COLLISION AVOIDANCE

(71) Applicant: Intel Corporation, Santa Clara, CA (US)

(72) Inventors: Leobardo Campos Macias, Guadalajara (MX); Carl S. Marshall, Portland, OR (US); David Arditti Ilitzky, Guadalajara (MX); David Gomez Gutierrez, Tlaquepaque (MX); Jose Parra Vilchis, Guadalajara (MX); Julio Zamora Esquivel, Zapopan (MX); Rafael De La Guardia Gonzalez, Guadalajara (MX); Rodrigo Aldana Lopez, Zapopan (MX)

(73) Assignee: Intel Corporation, Santa Clara, CA (US)

( * ) Notice: Subject to any disclaimer, the term of this patent is extended or adjusted under 35 U.S.C. 154(b) by 126 days.

(21) Appl. No.: 15/941,363

(22) Filed: Mar. 30, 2018

(65) Prior Publication Data

US 2019/0051194 A1    Feb. 14, 2019

(51) Int. Cl.
*G08G 5/04*    (2006.01)
*G08G 5/00*    (2006.01)
(Continued)

(52) U.S. Cl.
CPC ........... *G08G 5/045* (2013.01); *B64C 39/024* (2013.01); *G06K 7/10722* (2013.01); *G06K 7/1417* (2013.01); *G06K 9/0063* (2013.01); *G06K 19/06037* (2013.01); *G08G 5/0021* (2013.01); *G08G 5/0039* (2013.01); *G08G 5/0069* (2013.01); *G08G 5/0078* (2013.01); *B64C 2201/027* (2013.01); *B64C 2201/108* (2013.01);
(Continued)

(58) Field of Classification Search
None
See application file for complete search history.

(56) References Cited

U.S. PATENT DOCUMENTS

| 2012/0296497 A1 | 11/2012 | Lee et al. |
| 2017/0031369 A1* | 2/2017 | Liu .................. G05D 1/102 |

(Continued)

FOREIGN PATENT DOCUMENTS

| DE | 102018127144 | 6/2019 |
| KR | 20170074453 | 6/2017 |

(Continued)

OTHER PUBLICATIONS

U.S. Appl. No. 15/828,134, filed Nov. 30, 2017, Vision-Based Cooperative Collision Avoidance.

(Continued)

*Primary Examiner* — Abdhesh K Jha
(74) *Attorney, Agent, or Firm* — Schwegman Lundberg & Woessner, P.A.

(57) ABSTRACT

Methods and apparatus for drone collision avoidance. Processing circuitry of a drone extracts information from an encoded image captured by a detection device with a field view overlapping the encoded image. Based on the extracted information a determination is made whether a collision will occur on the flight trajectory of the drone with an external source. The flight trajectory of the drone is then altered to avoid a collision.

24 Claims, 12 Drawing Sheets

(51) Int. Cl.
*B64C 39/02* (2006.01)
*G06K 7/10* (2006.01)
*G06K 19/06* (2006.01)
*G06K 7/14* (2006.01)
*G06K 9/00* (2006.01)
*G06K 9/46* (2006.01)

(52) U.S. Cl.
CPC ...... *B64C 2201/141* (2013.01); *G06K 9/4652* (2013.01)

(56) References Cited

U.S. PATENT DOCUMENTS

| | | |
|---|---|---|
| 2017/0166325 A1 | 6/2017 | Gao et al. |
| 2018/0280780 A1* | 10/2018 | Nakao .................. B64C 39/024 |
| 2019/0037207 A1 | 1/2019 | Brockers et al. |
| 2019/0051193 A1 | 2/2019 | Gutierrez et al. |

FOREIGN PATENT DOCUMENTS

| | | |
|---|---|---|
| KR | 20170139326 | 12/2017 |
| WO | 2016154946 | 10/2016 |

OTHER PUBLICATIONS

"International Application Serial No. PCT US2019 020056, International Search Report dated Jun. 14, 2019", 3 pgs.
"International Application Serial No. PCT US2019 020056, Written Opinion dated Jun. 14, 2019", 6 pgs.
"U.S. Appl. No. 15/828,134, Non Final Office Action dated Sep. 5, 2019", 7 pgs.

* cited by examiner

PROJECTION-BASED COOPERATIVE COLLISION AVOIDANCE

TECHNICAL FIELD

Embodiments described herein relate generally to collision avoidance for aerial vehicles, such as drones. Embodiments are implemented in hardware, software, or a mix of both hardware and software.

BACKGROUND

Current collision avoidance capabilities for area vehicles, such as drones, have various limitations. For example, collision avoidance methods may be limited to detecting large objects, such as walls, have a slow reaction time, and/or rely on 3D cameras for localizing nearby objects. These capabilities may not be applied for agent-to-agent collision avoidance. A typical scenario where existing methods fail is when two drones are flying in a collision path that is at 90 degrees. This may occur in open space or in areas such as hallways.

Another known method of collision avoidance relies on either external localization or simultaneous localization and mapping (SLAM) algorithms. This method, however, only works after the vehicles have a common map. In addition, real-time SLAM algorithms require powerful computers that are not typically available on drones. SLAM algorithms may also be unreliable in dynamic environments.

Yet another method of collision avoidance is based on sharing sparse visual features to enable relative localization and cooperatively planning of collision avoidance maneuvers. Radio communication is then utilized between neighboring drones to provide such avoidance. Still, the reliance on the radio communication and coordination between individual agents presents difficulties in coordination.

DETAILED DESCRIPTION

Many current applications of drones, such as precision farming, inspection, search and rescue, and warehouse and inventory systems, may benefit from the interaction of multiple drones, including reducing the time required to complete such jobs. Still, often communication between drones is challenging because of obstructions that obstruct line-of-sight and cause multiple reflection of radio frequency (RF) signals. Such obstructions thus limit vision and communication between drones when attempting to perform jobs and tasks. Even for a drone hobbyist, similar problems occur when other drones exist in an area.

In an example, the disclosed collision avoidance procedures allow multiple drones to safely co-exist and operate in environments containing numerous obstructions. The camera system also captures images within the environment projected by other drones. The images projected include encoded data related to the drone. Such data includes, but is not limited to flight history, flight path, flight trajectory, drone speed, drone location data, and the like. The camera system captures the image and decodes the encoded data for collision avoidance purposes. Specifically, based on the decoded information related to the projecting drone, the capturing drone alters its flight path based on the decoded information.

The proposed procedures are simpler and faster than current SLAM based approaches which require registering agents, e.g., drones, stationary objects, watercraft, etc. in a global map prior to being able to plan any coordinated action. A common reference frame and environment map is not needed for various disclosed collision avoidance techniques. The disclosed techniques improve over simple reactive methods based on detection and tracking of dynamic obstacles by allowing agents to anticipate potential collision avoidance situations. Data acquired by different agents from encoded projections may be resolved, and used to determine the relative localization between two agents and respective neighbors. Additionally, the proposed procedures avoid loss of communication and coordination as a result of reflected RF signals by eliminating the need for the RF signals while still allowing the relative localization between two agents.

Figure 1:
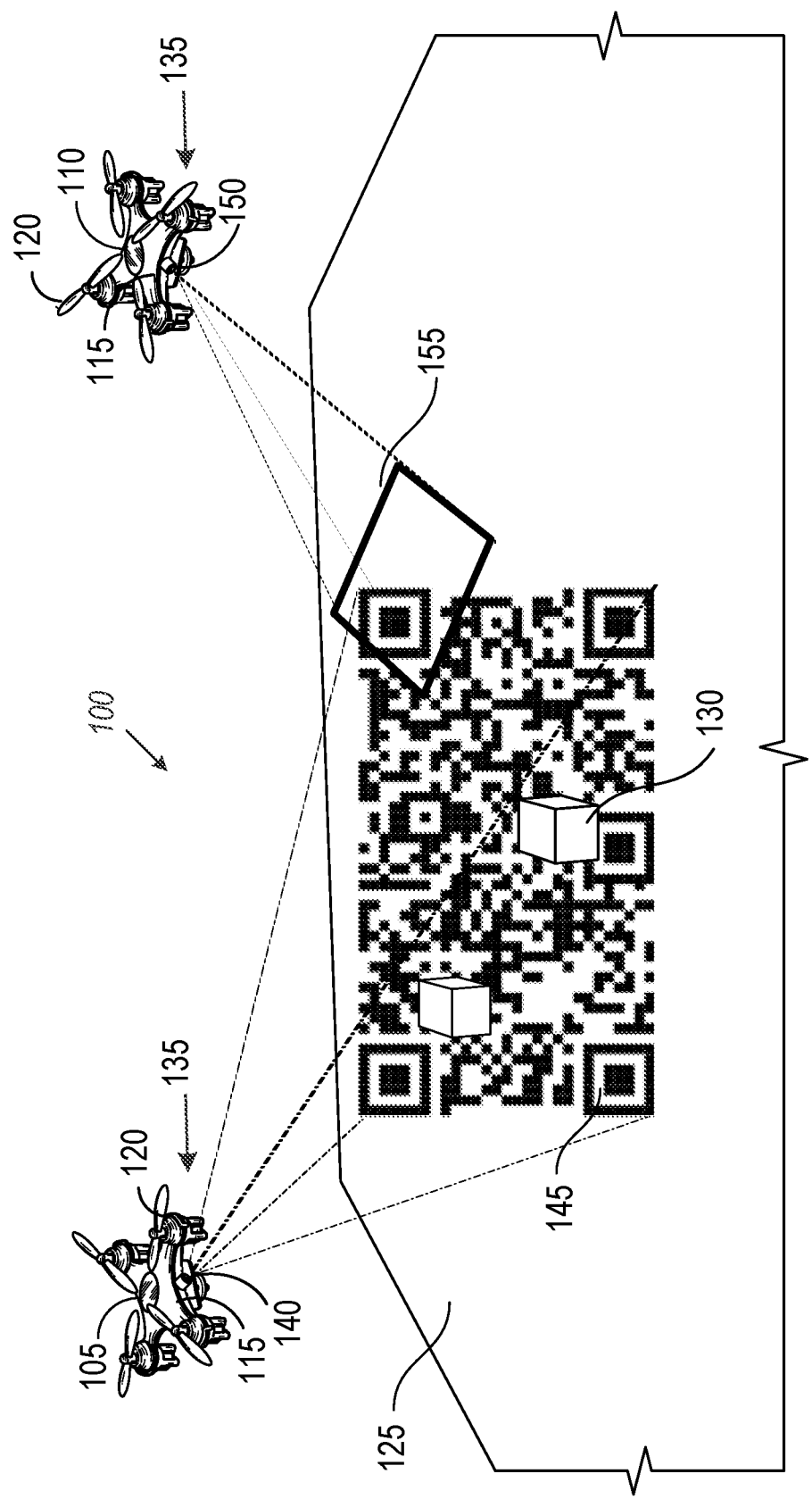
FIG. 1 illustrates capturing a projected image used for collision avoidance according to some embodiments.

FIG. 1 illustrates capturing a projected image used for collision avoidance according to some embodiments. A drone operating environment 100 includes a first drone 105 and a second drone 110. Each drone 105 and 110 may be of any type and in an example, each includes a frame 115 and propellers 120 allowing for autonomous flight over an environment 125 that includes numerous obstructions 130. Obstructions 130 may include walls, ceilings, vehicles, trees, other drones, or the like. Each drone 105 and 110 also includes a collision avoidance system 135.

The collision avoidance system 135 includes processing circuitry that operates to prevent a drone 105 and 110 from colliding with external sources such as walls, building, ceilings, obstacles, other drones, and the like. The collision avoidance system 135 includes a projection device 140 that in real time receives information related to the drone 105 or 110 and encodes a projected image 145. Information includes, but is not limited to drone speed, drone direction, drone rotation, drone acceleration, projected drone path, projected drone destination, and the like. The encoded projection is of any type, including QR-code, CCTag projection, bar code, spectrum based imaging, patterned imaging, combinations of these projections, and the like. The projection device 140 is any one of a tilt/pan camera or projector, 3-D camera such as a Kinect™, RealSense™, structure sensor, Asus Xtion™, and the like, a light emitting diode (LED) red, green, blue (RGB) camera or projector, and the like. Specifically, the projection device 140 is able to project, not just downwardly on the ground, but in multiple directions such as on objects including buildings and other obstacles, upwardly on ceilings, and the like.

The collision avoidance system 135 also includes a detection device 150 that has a field of view 155 to detect the encoded image 145 to retrieve the encoded message for decoding. The detection device 150 in an example is a tilt/pan 3D camera. Such 3D cameras include, but are not limited to a Kinect™, RealSense™ structure sensor, Asus Xtion™, and the like. Thus, the first drone 105 projects an encoded image 145 with a projection device 140 and that encoded image 145 is detected by the detection device 150 of the second drone 110 for decoding.

Based on the encoded image 145, the drone 105 or 110 detects the image 145 and determines the rotation and translation between the projection device 140 and the detection device 150. In this manner the drones are localized to one another. Also, in embodiments where the encoded image 145 is patterned and certain features of the pattern, such as squares, are aligned, transformation data is obtained. Specifically, once the pattern is aligned, the data embedded within the pattern is extracted. Such data or information includes, but is not limited to an intended trajectory for next several seconds, intended trajectory of a neighboring drone for next several seconds, drone's goal, neighboring drone's goal, recent mapping of surroundings of drone, drone altitude, current pan, tilt, or roll of projection device 140, or the like.

As an example of localization and alignment, one or more controllers decode the message and based on the information, the drones 105, 110 localize. In an example, the projection device 140 and detection device 150 are both cameras with a down-facing camera orientation. In the example, the drone is at a position $(x_0, y_0, z_0)^T$ and has a planned position $(x_p, y_p, z_p)^T$, X seconds in the future. Then the drone camera may be controlled to point towards $(x_p, y_p, z_g)^T$, where $z_g$ is the ground, e.g., 0. The first drone 105, in FIG. 1, is pointing to its $(x_p, y_p, z_g)^T$ position. Let û be the unitary vector pointing from $(x_0, y_0, z_0)^T$ to $(x_p, y_p, z_g)^T$:

$$\hat{u} = \frac{(x_p - x_0, y_p - y_0, z_g - z_0)^T}{\sqrt{(x_0 - x_p)^2 + (y_0 - y_p)^2 + (z_0 - z_g)^2}}$$

Let $R(\psi, \phi, \theta) = R(t)$ be the rotation matrix defining the transformation from the initial orientation of the drone to the current orientation given $\phi, \theta, \psi$ (roll, pitch, yaw, the Euler angles).

$$R(\psi, \phi, \theta) = \begin{bmatrix} \cos\theta\cos\psi & -\cos\phi\sin\psi + \sin\phi\sin\theta\cos\psi & \sin\phi\sin\psi + \cos\phi\sin\theta\cos\psi \\ \cos\theta\sin\psi & \cos\phi\cos\psi + \sin\phi\sin\theta\sin\psi & -\sin\phi\cos\psi + \cos\phi\sin\theta\sin\psi \\ -\sin\theta & \sin\phi\cos\theta & \cos\phi\cos\theta \end{bmatrix}$$

Furthermore $\hat{f}_0$ denotes a unit vector pointing in the direction of the front of the drone from where it launched, and $\hat{f}(t)$ is the unit vector pointing in the direction of the front of the drone at a given time t. Note that:

$$\hat{f}(t) = R(t)\hat{f}_0$$

Accordingly, there is a transformation matrix $R_G(\psi_G, \phi_G, \theta_G)$ that the gimbal may perform to orient the camera from pointing towards $\hat{f}(t)$ to $\hat{u}$. This relationship may be written as:

$$\hat{u} = R_G \hat{f}(t) = R_G R(t) \hat{f}_0$$

Thus, localization and alignment between multiple drones is accomplished.

Therefore, one or more controllers that include processing circuitry alter drone flight path to avoid a collision without the use of radio frequency. In an example, the flight path is automatically altered by the one or more controllers. The one or more controllers utilize any methods to avoid collision, including but not limited to utilizing a reactive collision avoidance algorithm, conflict solving and hierarchal techniques, utilization of virtual force techniques, and the like.

Figure 2A:
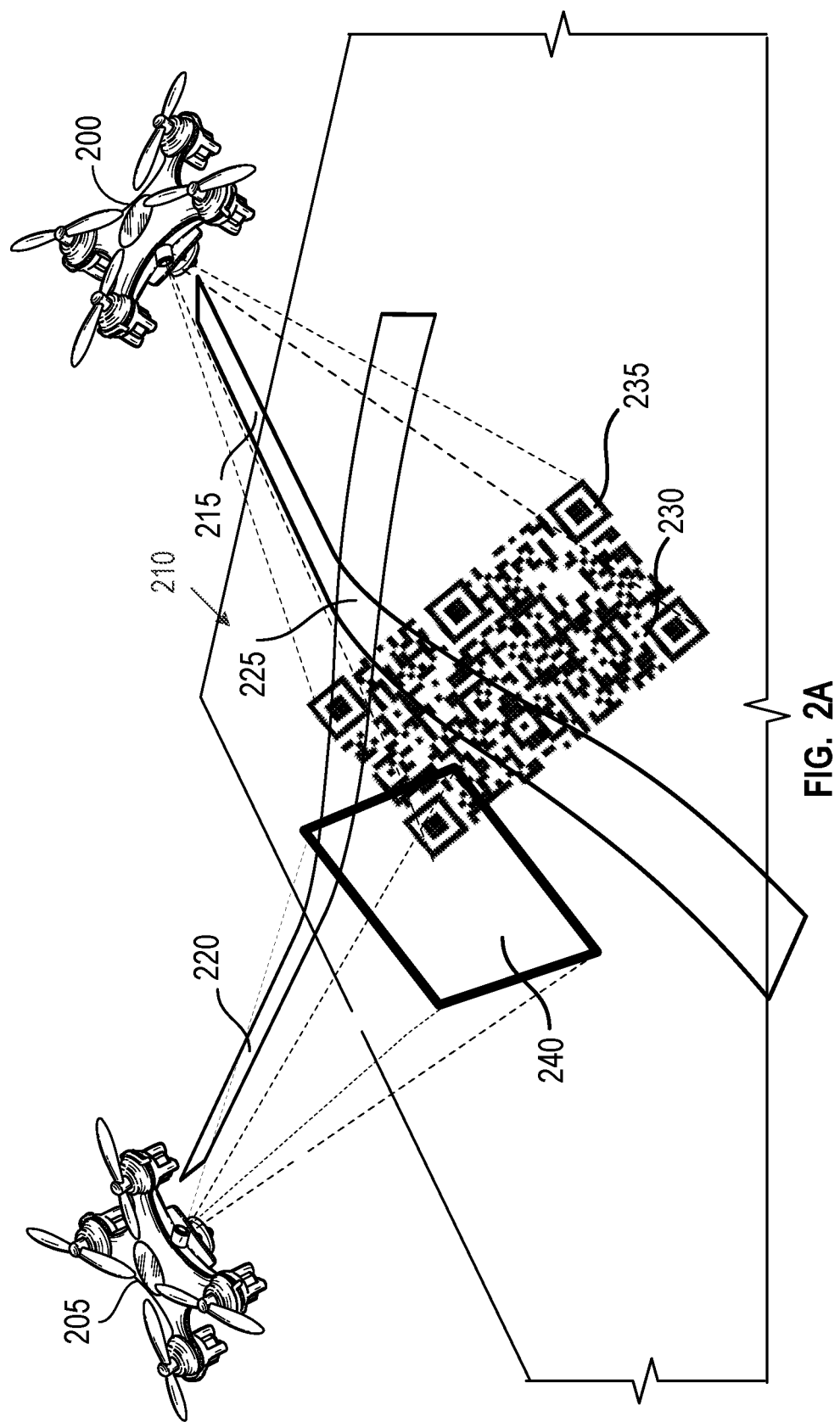
FIGS. 2A-2B illustrate a cooperative collision avoidance technique according to some embodiments.
Figure 2B:
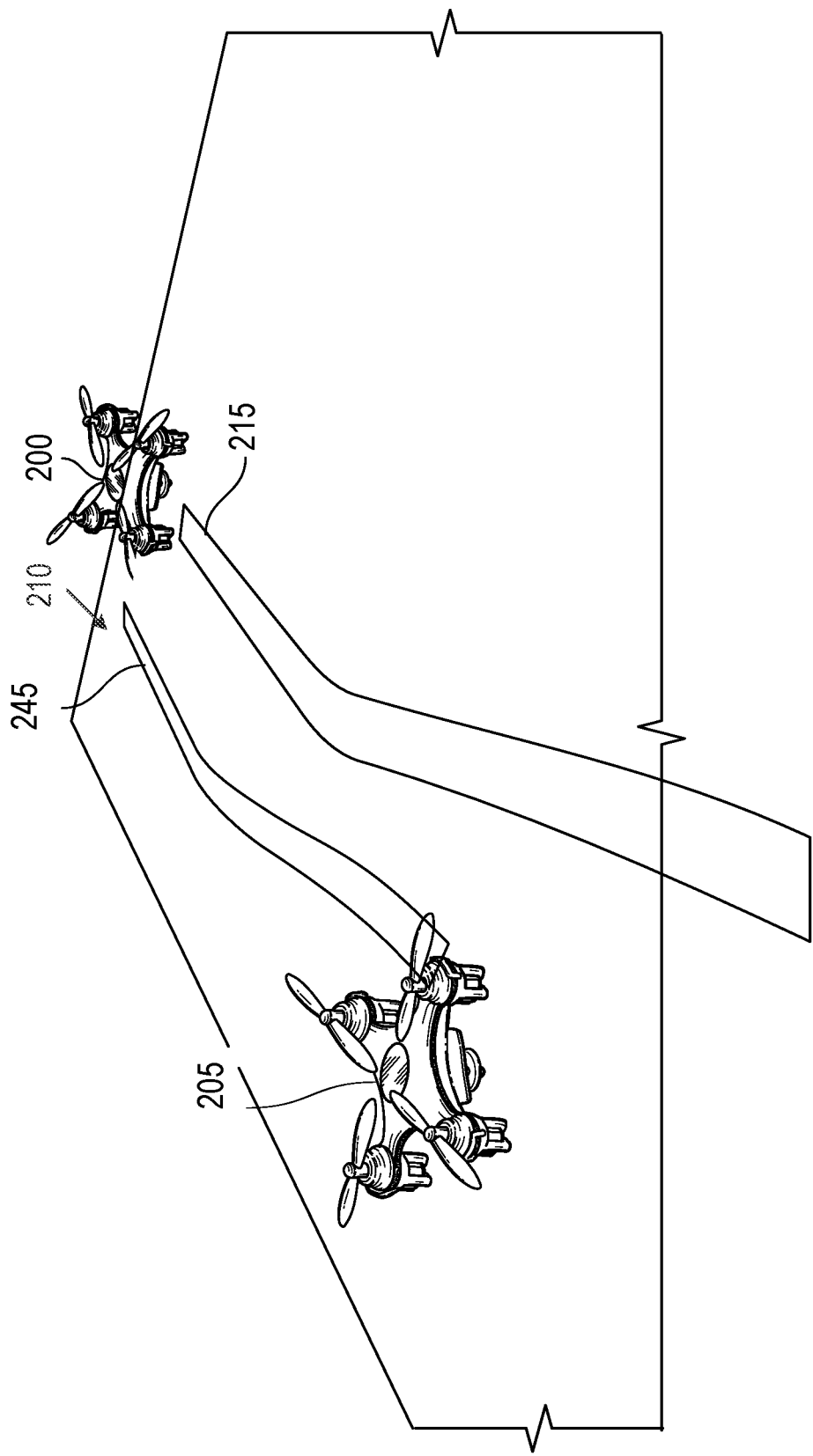

FIGS. 2A and 2B illustrate a cooperative collision avoidance technique according to some embodiments. The techniques are implemented in some examples by a collision avoidance system, such as the collision avoidance system 135 of FIG. 1. In FIG. 2A, the first and second drones 200 and 205 traverse an environment 210. In this example, the flight path 215 of the first drone 200 overlaps with the flight path 220 of the second drone, indicating a collision path 225. In the environment 210, a projected encoded image 230 from a camera of the first drone 200 has a projection area 235 that overlaps with a field of view 240 of a camera of a second drone 205. The projection area 235 is controlled by steering the camera based on the velocity and maneuverability of the first drone 200. The encoded image 230 includes encoded information related to the trajectory, flight path, speed, and other similar information that may be utilized to determine the relative position of the first drone 200 represented by the rotation and transformation of the drone 200. The camera of the second drone 205 detects the encoded information and decodes the information. Based on the information, the second drone selects an alternative flight path 245 to avoid collision (as shown in FIG. 2B).

In an example, the encoded image 230 is a pattern and the camera with field of view 240 is a pan/tilt camera. The pan/tilt camera may be a visible spectrum camera, infrared camera, or the like. The projection area 235 is either on the ground, ceiling, object, or the like that the first drone 200 in planning to overfly in X seconds. In this way an agent, or drone, nearby observes the image at least X/2 seconds before a collision. In addition, to allow localization, the projection 230 includes embedded data such as intended trajectory, a location of a neighboring drone, recent mapping of a local area, current height, current speed, current pan/tilt/roll for where the first drone 200 is to traverse over the next few seconds, and the like. In this manner radio communication is unnecessary and the speed at which detection and thus collision avoidance occurs is enhanced.

The example encoded image 230 is illustrated as a QR-like pattern that may utilize different patterns and coloring to ensure when more than one projected image is presented in an area that a detection device may distinguish between the different projections. Alternatively, projected images from different drones are provided intermittently and times are adjusted for projections based on information received from each encoded image to prevent synchronization of the intermittent projection to ensure each encoded image projects at a different time. Another example used to separate codes is through redundancy of information encoded within a projected image. In this manner only a section of the encoded image needs to be in the field of view to receive encoded information and localize other drones.

Figure 3:
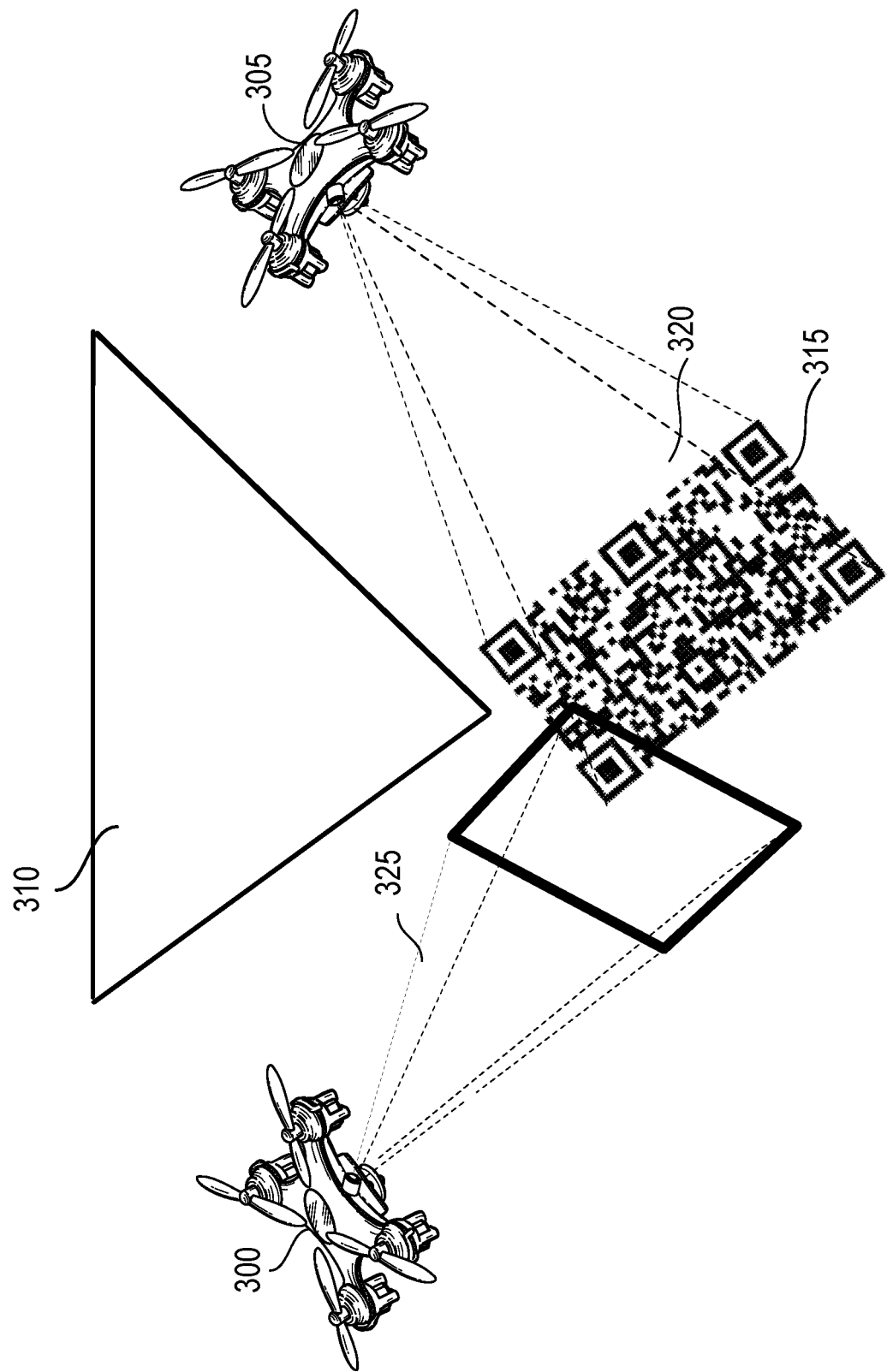
FIG. 3 illustrates a cooperative collision avoidance technique according to some embodiments.

FIG. 3 illustrates a cooperative collision avoidance technique according to some embodiments. In this example, first and second drones 305 and 300 do not have a line of sight of one another. In this example a building 310 separates drones 300 and 305. The first drone 305 projects an encoded image 315 that is partially projected onto the building 310 and partially projected onto the ground 320. The field of view 325 of the camera of the second drone 300 captures a section of the partially projected image 315 on the ground 320. The encoded image 315 is encoded with multiple redundancies of the data such that the section of the partially projected image 315 in the field of view 325 of the camera contains data or information that may be decoded and utilized by the second drone 300 to avoid collision with the first drone 305.

Figure 4A:
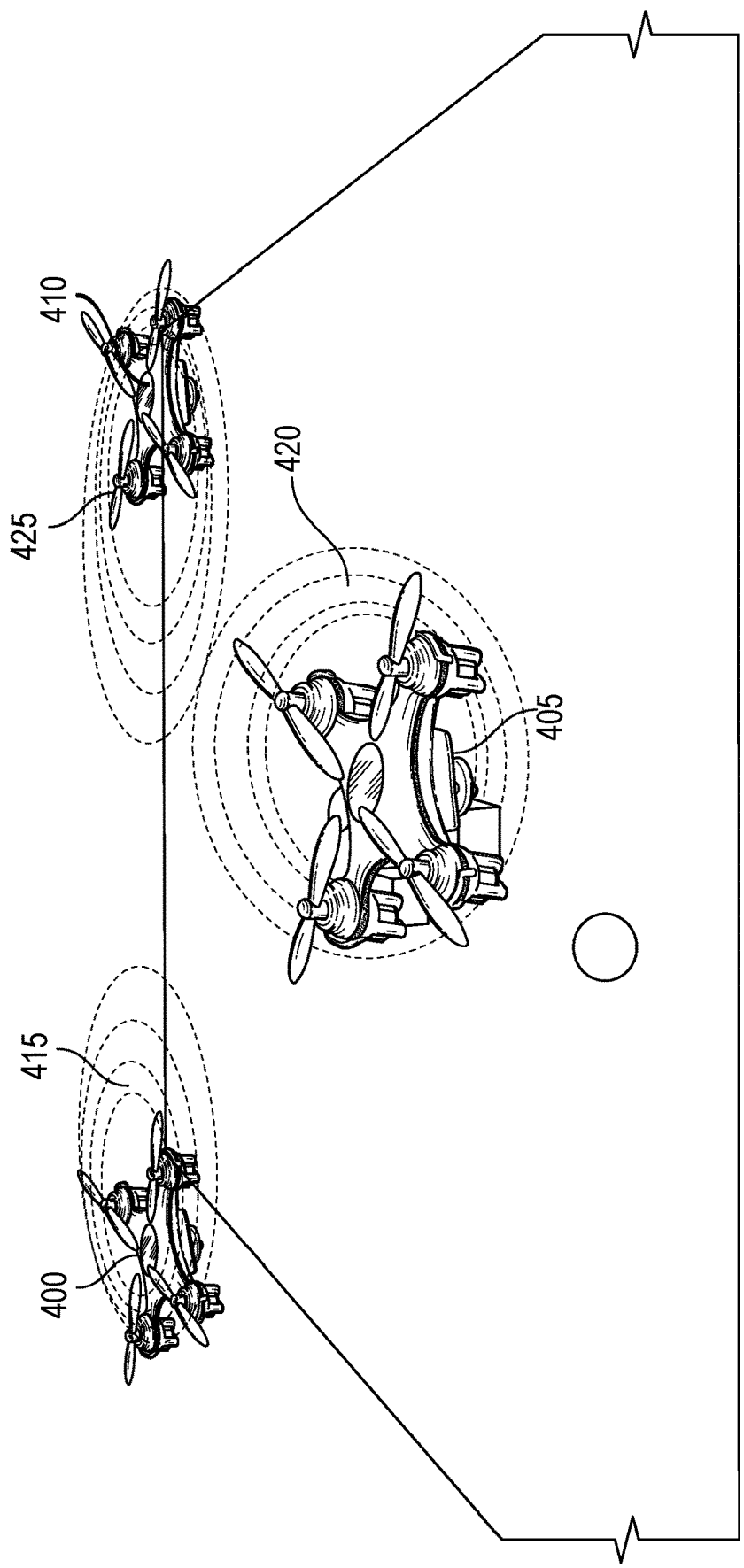
FIG. 4A-4B illustrate a cooperative collision avoidance technique of three drones according to some embodiments.
Figure 4B:
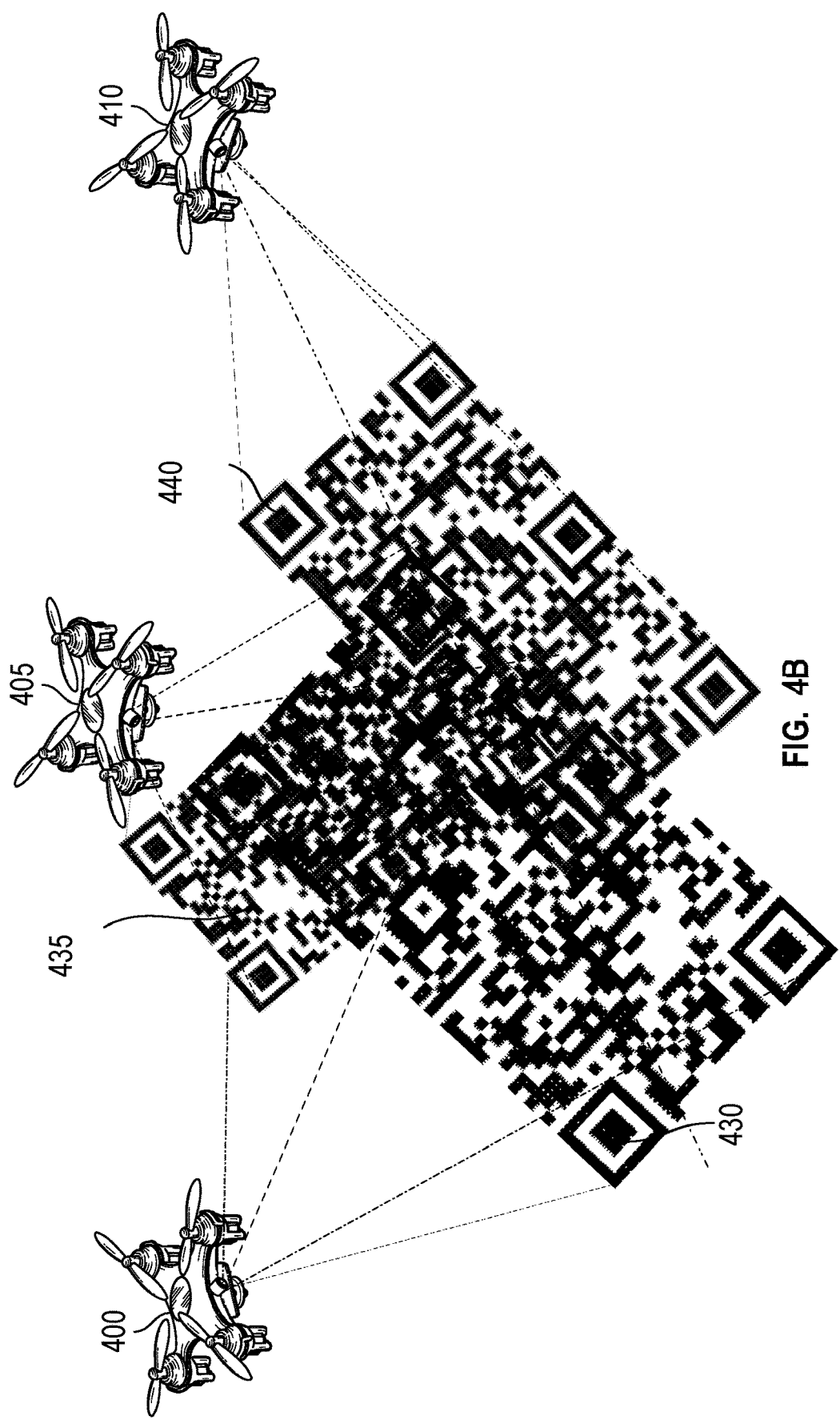

FIGS. 4A-4B illustrate a cooperative collision avoidance technique of three drones according to some embodiments. Three agents, or drones 400, 405, and 410, in an environment are in a collision trajectory, causing the drones 400, 405, and 410 to localize each other in advance and place virtual forces on the other drones to avoid collisions using a reactive collision avoidance algorithm.

Each of these drones 400, 405, and 410 may have a virtual force, 415, 420, and 425 respectively. A virtual force may be based on the velocity of a drone. In an embodiment, the virtual force may be detected or determined based on an encoded image 430, 435, and 440 of each drone 400, 405, and 410. The drones 405 and 410 have velocities with respect to the reference frame of the drone 400 $\vec{v}_A$ and $\vec{v}_B$, and the relative velocity $\vec{v}_{AB} = \vec{v}_B - \vec{v}_A$ may be obtained, as well as the relative position $\vec{R}_{AB}$. The virtual force may be based in the following formula:

$$\vec{F}_{AB} = \exp(-\lambda \vec{v}_{AB} \cdot \vec{R}_{AB}) \frac{\vec{R}_{AB}}{\|\vec{R}_{AB}\|^2}$$

where $\lambda$ is a design parameter that defines the size of the potential field, with a nominal/central value of 1. The direction of the force points away from the drone 405 and its magnitude decreases inversely/quadratically with the distance as well as with the direction of the relative velocity due to the $\exp(-\lambda \vec{v}_{AB} \cdot \vec{R}_{AB})$ factor. This term decreases as the drone 405 moves away from the drone 400. This value is 1 when the drone 405 moves parallel to the drone 400. This term increases as the drone 405 moves toward the drone 400.

Virtual forces 415, 420, and 425 may be applied to any number of drones or other objects, so that the drone 400 generates a virtual force 415 for each one of drones and/or other objects. This virtual force 415 may then be added to the default position control that the drone 400 is implementing. In an embodiment, there is a position control on top of an attitude control, where the former generates commands for the latter. These virtual forces 415, 420, 425 may be added to the position control to generate the new attitude commands. The mixer takes the attitude commands and generates the respective power to be applied to the motors. The virtual forces 415, 420, 425, therefore, may affect the acceleration of the drone. This change generates a change in the reference of the attitude control, which changes the movement of the drone 400, 405, 410.

As an example, the virtual force 415, 420, 425 may then be used to update the flight path of the drone 400 by adjusting the input to the attitude controller. The same calculations from the reference of the drone 405 may be done to calculate a virtual force 420. As the drones 400 and 405 fly towards one another, the drones 400 and 405 will repulse one another based on their calculated virtual forces 415 and 420. From an external vantage point, the drones 400 and 405 look as if they repulse one another as they fly to close to one another. Each drone 400 and 405 adjusts its flight path to avoid colliding. As the drones 400 and 405 fly past one another, the virtual force values decrease and each of the drones 400 and 405 impact the flight path of the other drone less.

Figure 5:
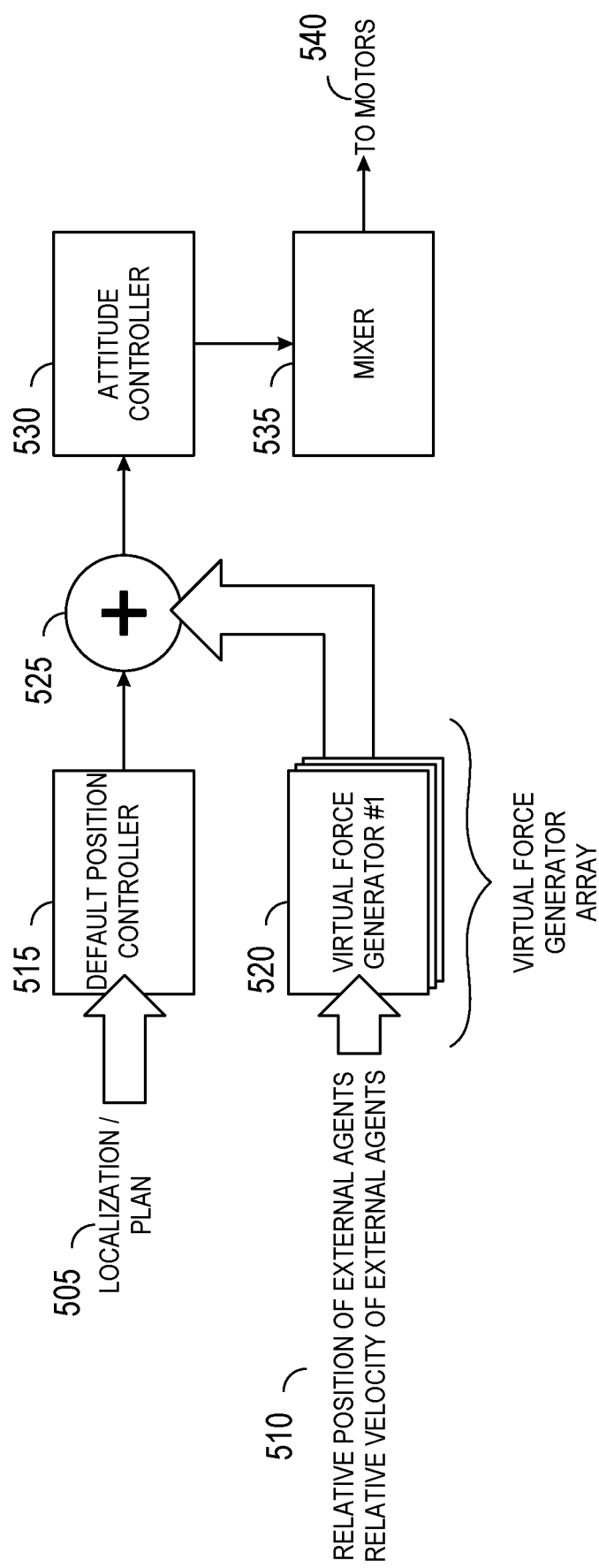
FIG. 5 illustrates a block flow diagram for attitude adjustment according to some embodiments.

FIG. 5 illustrates a block flow diagram for attitude adjustment according to some embodiments. A drone has a flight plan 505 that is input into a position controller 515. Without additional input, the position controller 515 would provide a command to an attitude controller 530. The attitude controller 530 provides commands to a mixer 535 that determines and applies the appropriate power to motors 540. Thus, a drone may fly along its planned route 505. Without additional input, however, the drone may collide with other drones or objects.

To avoid other drones, relative positions and relative velocities of a drone 510 are received from an encoded image that is projected by another drone, detected and decoded by the drone and provided to a virtual force generator 520. A virtual force may be generated for the drones located nearby the drone. The virtual forces may then be added 525 to the commands from the position controller 515. Thus, a drone may have its flight deviate from the plan 505 based upon the location and velocities of drones that are nearby, e.g., drones that may collide with the current drone. While the flow chart is directed toward an attitude adjustment utilizing virtual forces, other attitude adjustment methodologies are contemplated. In particular, as a result of detecting and decoding information from an encoded projection, collision avoidance methodologies may be taken based on the information without use of radio frequency.

Figure 6:
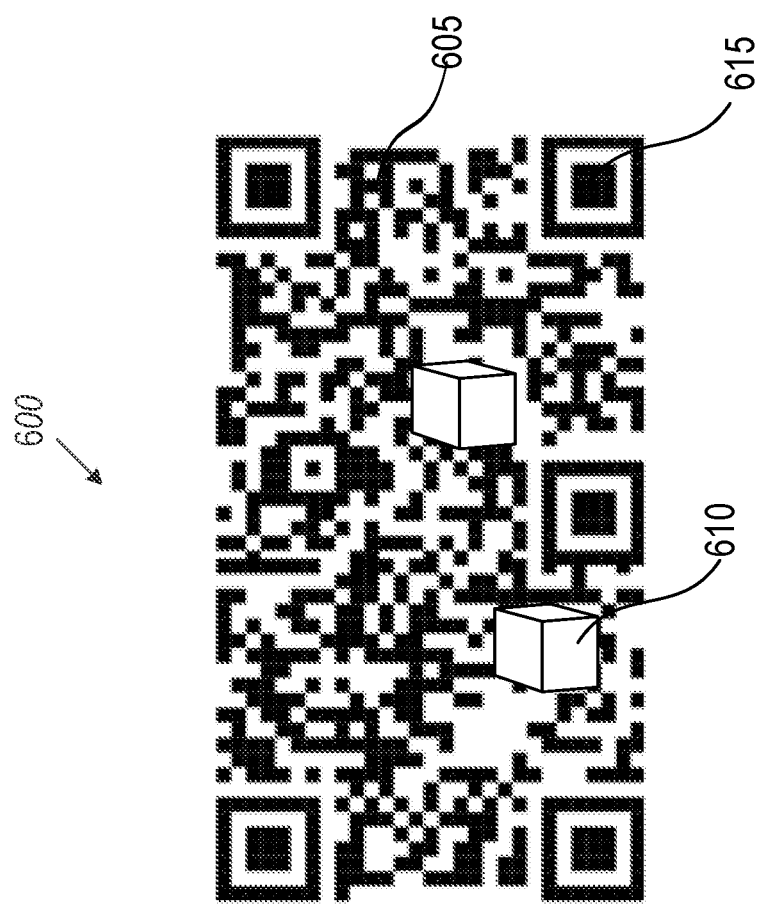
FIG. 6 illustrates a projected image used for collision avoidance in accordance with an illustrative embodiment.

FIG. 6 illustrates a projected image used for collision avoidance in accordance with an illustrative embodiment. An example projected image 600 of a first drone may be utilized to embed information for detection and utilization by a second drone. In one embodiment the encoded image 600 is one of the projections used by drones described in relation to FIGS. 1-4B. The image 600 includes both a pattern 605 and objects 610. This includes three-dimensional objects generated by a projection device. The pattern 605 includes squares 615 and other identifying patterns that are two dimensional. The objects 610 include shapes that are three dimensional. The pattern 605 and objects 610 may be of any size or color. In an example, redundant information is embedded in the pattern and objects, including by providing repeat patterns, objects, and coloring in the projection. The redundant information is utilized to ensure, even if only a section of the encoded image 600 is within a field of view of a detection device, desired information is shared.

In addition, as characteristics of the drone such as velocity, trajectory, flight plan, or the like change, the pattern, objects, and coloring change to present an updated image 600. In particular, such changes include, but are not limited to pattern colors, pattern shapes, pattern arrangement, object shape, object color, object location, or the like. Additionally, the collision avoidance system in certain embodiments detects the projection area surface color, shadowing, texture, or the like and alters characteristics of the encoded image 600 such as coloring, patterns, objects, or the like to make the projection easier to detect by other drones and users. Similarly, the collision avoidance system in certain embodiments detects overlapping projection areas and changes image characteristics to avoid confusion and increase detectability of the projected image.

While the projected image 600 of FIGS. 1-4B has been generally illustrated as a QR-code, different images, including different patterns and/or coloring are contemplated. In some embodiments, example images may embed information based of visual robustness such as scale, orientation and illumination invariance. In some embodiments, example images may embed redundant information via any manner, including spatial and temporal redundancies in the image. In some embodiments, example images may be encoded and decoded by optical and computer vision method and techniques. In some embodiments example images may be separated from multiple overlapping images or sources. In some embodiments example images may preserve camera depth resolution.

Figure 7:
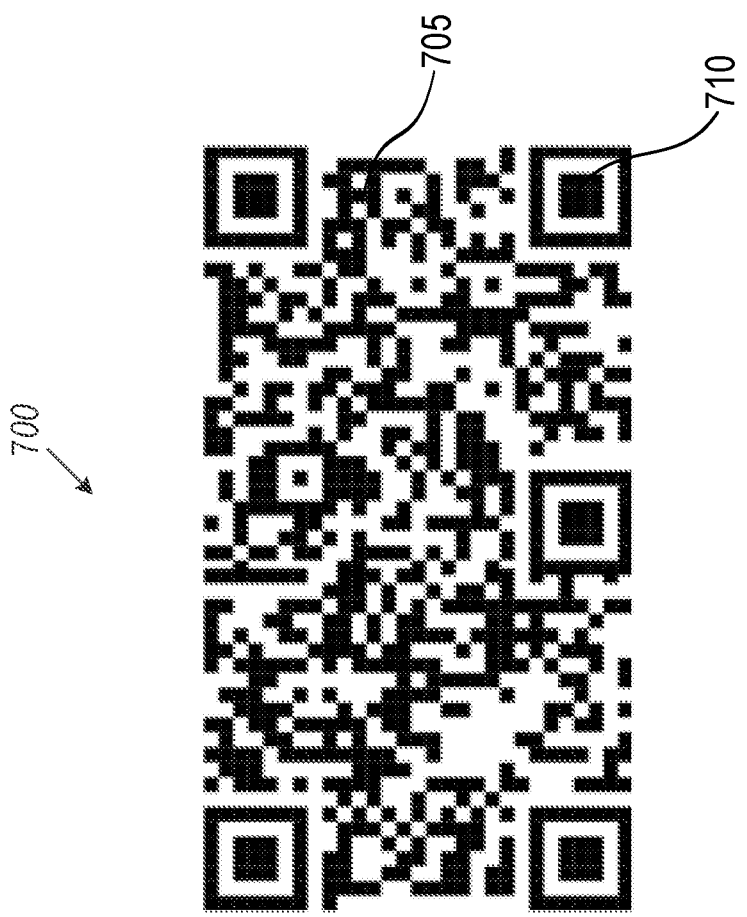
FIG. 7 illustrates a projected image used for collision avoidance in accordance with an illustrative embodiment.

FIG. 7 illustrates a projected image used for collision avoidance in accordance with an illustrative embodiment. In an embodiment, the image 700 is one of the encoded images used by drones described in relation to FIGS. 1-4B. In this example the projected image is a QR-code that includes a pattern 705 with embedded information therein. The QR-code may be of any size or color. Based on the pattern 705, redundant information is embedded. Specifically, the QR-code may include square elements 710 and other redundancies throughout the image. The redundant information is utilized to ensure, even if only a section of the image 700 is within a field of view of a detection device, desired information is shared.

In addition, as characteristics of the drone such as velocity, trajectory, flight plan, or the like change, the pattern arrangement, colors, size, and the like change to present an updated image 700. Additionally, the collision avoidance system in certain embodiments detects the color of the projection area, such as the ground, building, ceiling, or the like, and alters coloring and/or other characteristics of the image to make the image easier to detect by other drones. Similarly, the collision avoidance system in certain embodiments detects overlapping images and changes coloring, pattern, or the like to avoid confusion and increase detectability of the image.

Figure 8:
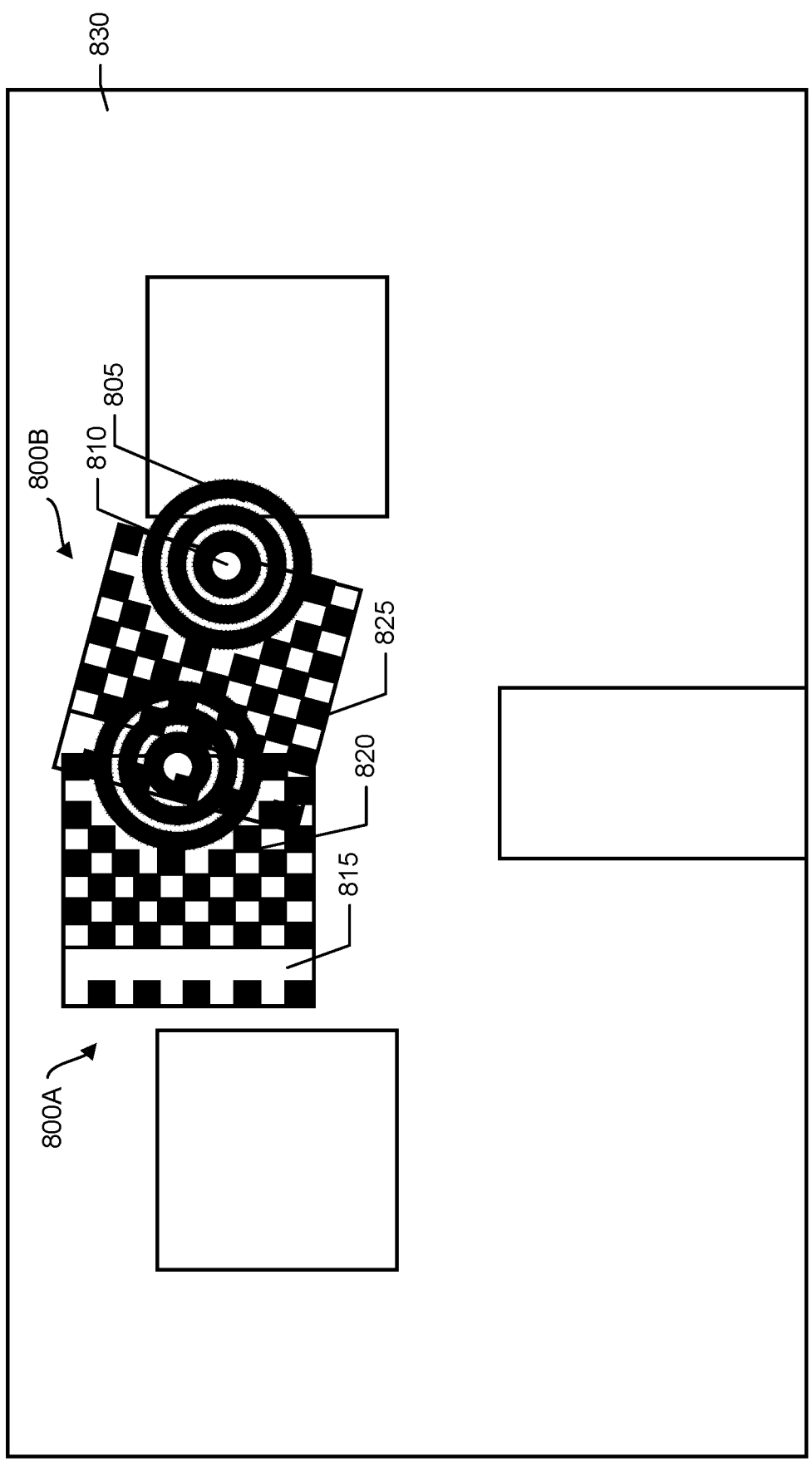
FIG. 8 illustrates two drones projecting images for a cooperative collision avoidance technique according to some embodiments.

FIG. 8 illustrates two drones projecting images for a cooperative collision avoidance technique according to some embodiments. In this example, first and second drones project overlapping first and second encoded images 800A and 800B. Each image 800A and 800B are from a separate drone and includes embedded information for detection and utilization by other drones. In this embodiment the encoded image 800 is a CCTag fiducial formed by LED lighting that is included in a projection device. Each image 800A and 800B includes a series of concentric circles 805 of different widths with a center circle 810 that is solid white at the center position of the projection. A stripe 815 that in one example is red marks a border of the image 800A. A central region 820 is formed by blocks 825 that in one example are in two different shades of green. Similarly, the stripe 815 may include different shades of red to embed a tag code and identify the outer edge of the tag.

As shown in FIG. 8, two images 800A and 800B are projected onto an object 830 such as a wall. When these images 800A and 800B overlap, in order to decode the encoded images 800A, 800B, the image is processed in the LAB color space.

The LAB color space is a three-dimensional representation of colors of a projection that have coordinates (L*,a*,b*), where the coordinate L* defines a lightness or luminance axis, a* a redness-greenness axis, and b* a yellowness-blueness axis. Values of L* range from 0 for black to 100 for a perfectly diffusing white. Thus, a detection device receives colors within an image in a L-channel, a-channel, and b-channel for processing.

Tristimulus values X,Y,Z of a given color in a projection are normalized against the tristimulus values $X_n,Y_n,Z_n$ of a white reference to give $X/X_n,Y/Y_n,Z/Z_n$. Sensory compression of the response is represented by an applied transformation $(X/X_n)^{1/3}$, $(Y/Y_n)^{1/3}$, $(Z/Z_n)^{1/3}$. Numerical scaling is applied to $(Y/Y_n)^{1/3}$ to give the coordinate L* and other numerical scalings are applied to the differences $(X/X_n)^{1/3}-(Y/Y_n)^{1/3}$ and $(Y/Y_n)^{1/3}-(Z/Z_n)^{1/3}$ to give the coordinates a* and b*.

Thus, by utilizing the LAB color space, some color-appearance attributes may be obtained from L*,a*,b* by defining chroma. $C^*_{ab}$ as $(a^{*2}+b^{*2})^{1/2}$ and hue $h_{ab}$ as an angle $\tan^{-1}(b^*/a^*)$, in degrees, to form a cylindrical coordinate system, where chroma represents the relative colorfulness detected. Thus, saturation is the colorfulness of an area in proportion to brightness. Therefore, color difference $\Delta E^*_{ab}$, between a first stimulus 1 and a second stimulus 2, is defined as $[(L^*_1-L^*_2)^2+(a^*_1-a^*_2)^2+(b^*_1-b^*_2)^2]^{1/2}$.

As an example, the luminance channel is first determined. Binarization of the luminance image is provided by double thresholding. The first step is to decode the two CCTags observed in the image to obtain the center position of the corresponding targets. The next step is to use temporal information from past detections to associate the projections to traced objects, taking motion constraints into account.

The a-channel is processed to extract the border of each projection 800A, 800B, hence why the stripe 815 typically is red. If the border is not found within a certain distance from the solid white central region 810 within the concentric circles 805, the corresponding projection 800A or 800B is dropped. Similarly, the central region 820 is often provided in green. In such embodiments, if no green pixels are found in the central region 820 between the stripe 815 and the central region 810, again, the projection is dropped.

In the embodiment, the embedded code in the green central region 820 is obtained by processing the b-channel. The green pixels are clustered such that the decision boundary is the midpoint of the maximum and minimum so that the clusters represent the 1 and 0 values defining the tag signature. In an example, the decoded signature is identified as a match using a pre-determined hash table containing all the signatures. In this manner the signature may represent a unique identifier of the drone.

Additionally, the drone may attempt to locate a region that is in a shadow for the projection to allow greater lumens in that region. Each drone may apply real-time keystone correction to make its projected surface appear undistorted or rectified. The drones may also view the projection surface and apply color compensation for the images 800A or 800B based on the surface color, texture, shininess, and the like.

Figure 9:
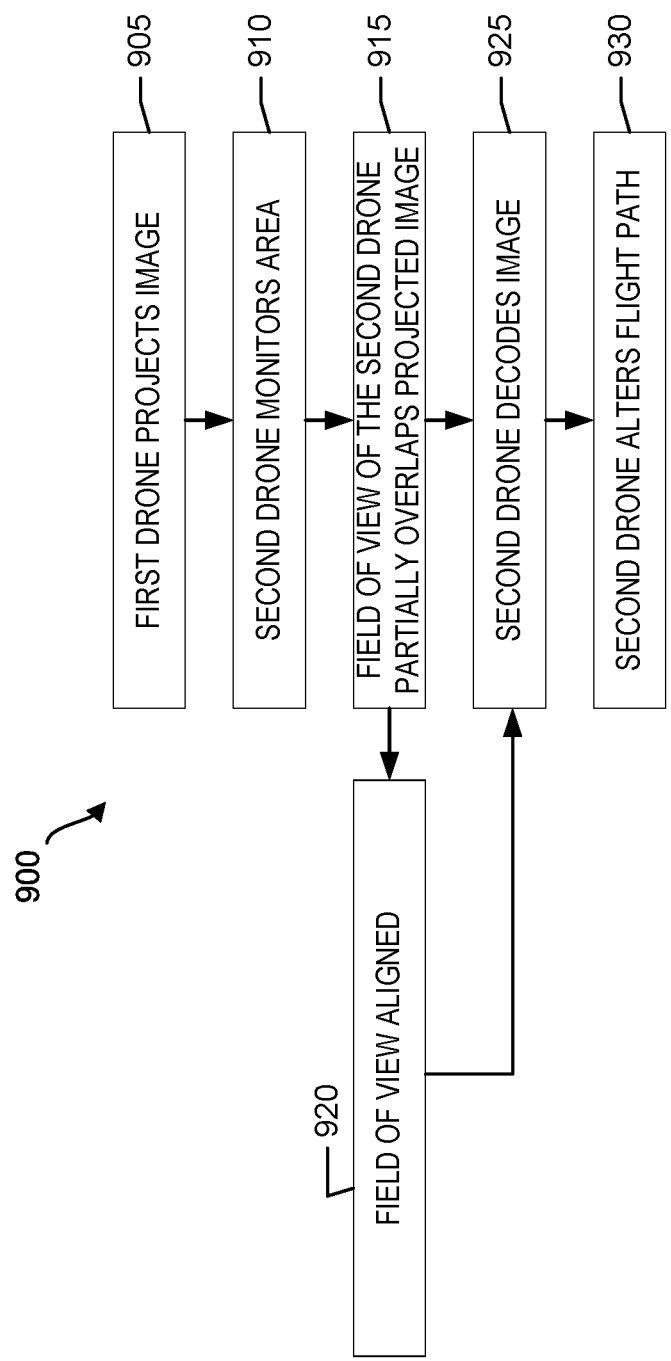
FIG. 9 is a block flow diagram for neighbor localization according to some embodiments.

FIG. 9 is a block flow diagram for neighbor localization according to some embodiments. In the example, the block flow diagram shows a method of avoiding a collision between two drones 900. At 905, a first drone projects an encoded image onto at least one surface. The encoded image includes, but is not limited to a QR-code, spatial pattern, color pattern, bar code, known shapes, a combination of any of these encoded images, and the like. In particular, in examples, the image includes example projections described in FIGS. 6-8. The image may include redundant data encoded throughout the image. The image is projected with redundant patterns, colors, shapes, or the like. The image is projected with any type of image projection device, including but not limited to a 3D camera such as Kinect™, RealSense™, structure sensor, Asus Xtion™, and the like.

At 910, a second drone monitors a field of view with a detection device for images. The detection device may include, but is not limited to a 3D camera such as Kinect™, RealSense™, structure sensor, Asus Xtion™, and the like. The detection device may provide a field of view upwardly, downwardly, at predetermined angles, or in any given direction. At 915, the field of view of the detection device at least partially overlaps with the projected encoded image. Optionally, at 920, the second drone aligns the field of view with the encoded image.

At 925, the second drone decodes the projected encoded image to receive data related to the first drone and/or another neighboring drone. Specifically, if a neighboring drone is in the area that provides an encoded projection that is not in the field of view of the second drone, but is in the field of view of the first drone, data related to the neighboring drone may be encoded in the projected encoded image of the first drone such that that data may be received by the second drone despite the field of view of the second drone not overlapping with the projected encoded image of the neighboring drone.

At 930, the second drone alters its flight path to avoid collision with another drone based on the decoded data. The flight path may be altered to avoid collision with the first drone or a neighboring drone. Any methodology may be used to avoid collision. This includes but is not limited to use of collision avoidance algorithms, utilization of virtual force techniques, and the like.

Figure 10:
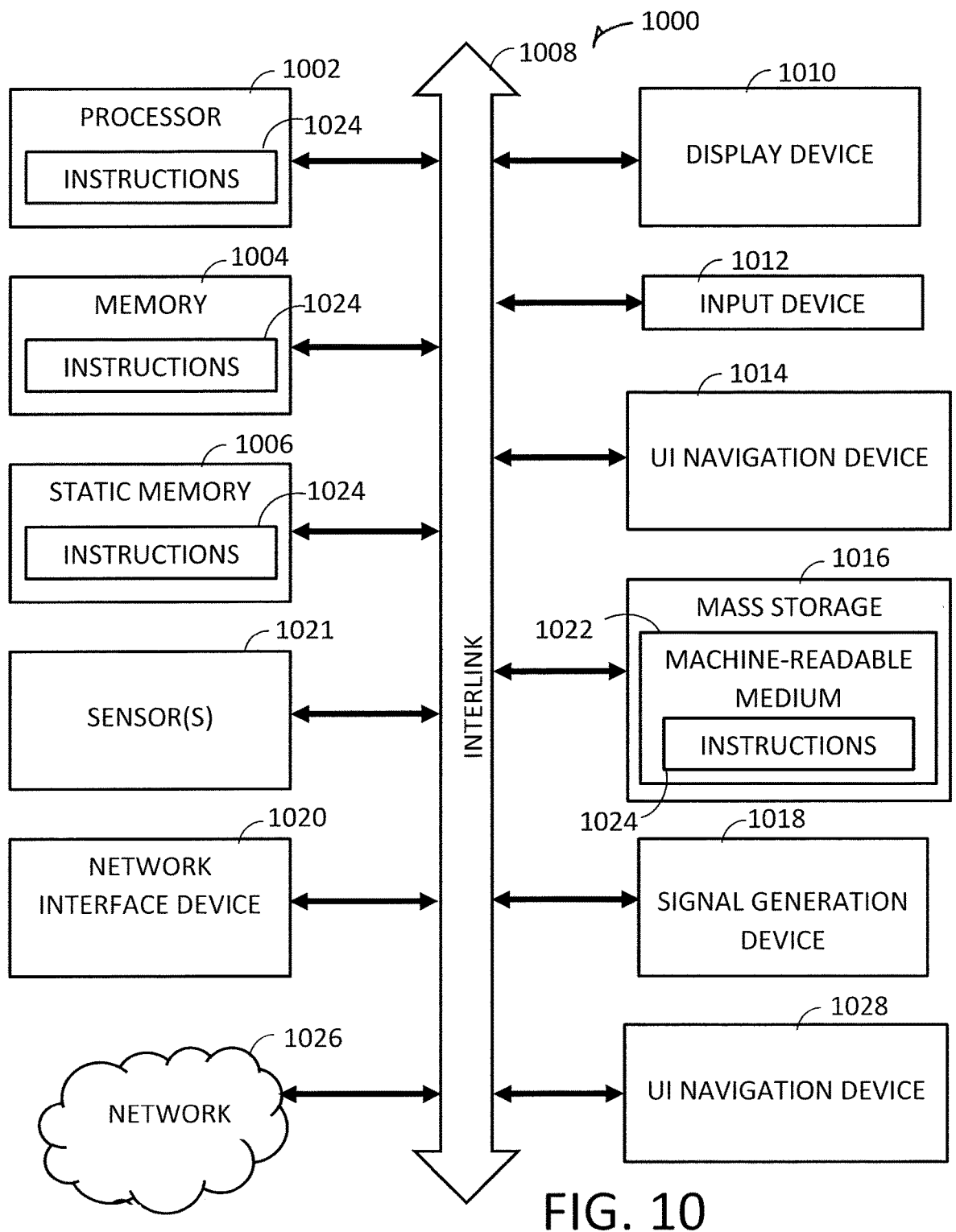
FIG. 10 illustrates a block diagram of computing device, within which a set or sequence of instructions may be executed to cause the device to perform examples of any one of the methodologies discussed herein.

FIG. 10 illustrates a block diagram of an example machine 1000 upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, engines, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

Additional Notes and Examples

Example 1 is an apparatus for a drone collision avoidance, the apparatus comprising: processing circuitry of a drone on a flight trajectory to: extract information from an encoded image, the encoded image captured by a detection device with a field of view overlapping the encoded image; determine if a collision with an external source will occur on the flight trajectory based on the extracted information; and alter the flight trajectory of the drone to avoid the collision.

In Example 2, the subject matter of Example 1 optionally includes wherein the drone is a first drone and the external source is a second drone.

In Example 3, the subject matter of any one or more of Examples 1-2 optionally include wherein the encoded image is a QR-code.

In Example 4, the subject matter of any one or more of Examples 1-3 optionally include wherein the encoded image is a CCTag.

In Example 5, the subject matter of any one or more of Examples 1-4 optionally include wherein information is extracted from the encoded image based on the color of the encoded image.

In Example 6, the subject matter of any one or more of Examples 1-5 optionally include wherein information is extracted from the encoded image base on a pattern within the encoded image.

In Example 7, the subject matter of any one or more of Examples 1-6 optionally include wherein the processing circuitry is further configured to: encode an image with information related to the drone; and project the encoded image with a camera onto a surface.

In Example 8, the subject matter of Example 7 optionally includes wherein the information related to the drone includes one of drone velocity, drone trajectory, drone flight path.

In Example 9, the subject matter of any one or more of Examples 7-8 optionally include wherein encoding the image with information comprises encoding redundant information into the image.

In Example 10, the subject matter of any one or more of Examples 7-9 optionally include wherein the surface is a ceiling.

In Example 11, the subject matter of any one or more of Examples 7-10 optionally include wherein the processing circuitry is further configured to: determine a color of the surface; and modify the color of the projected encoded image based on the color of the surface.

In Example 12, the subject matter of any one or more of Examples 7-11 optionally include wherein the processing circuitry is further configured to: detecting when the projected encoded image overlaps with a projected encoded image of a second drone; and modify the projected encoded image based on the projected encoded image of the second drone.

In Example 13, the subject matter of any one or more of Examples 1-12 optionally include wherein the processing circuitry is configured to: determine a relative velocity of the external source based on the encoded image provided by the external source; determine a virtual force based on the relative velocity of the external source; and changing acceleration of the drone based of the virtual force to alter the flight trajectory.

In Example 14, the subject matter of Example 13 optionally includes wherein to determine if a collision with the external source will occur the processing circuitry is configured to: determine a location of the drone based on the current flight trajectory for a time point; determine a location of the external source based on the encoded image of the external source for the time point; and determine if the location of the drone is the same as the location of the external source at the time point.

In Example 15, the subject matter of any one or more of Examples 1-14 optionally include wherein the processing circuitry is further configured to: align a camera of the drone with the encoded image before extracting information from the encoded image.

In Example 16, the subject matter of any one or more of Examples 1-15 optionally include wherein extracting information from an encoded image comprises decoding the encoded image.

In Example 17, the subject matter of Example 16 optionally includes wherein decoding the encoded image comprises processing the image in LAB color space.

In Example 18, the subject matter of Example 17 optionally includes wherein decoding the encoded image further comprises: determining a tag signature based on processing the image in the LAB color space; and comparing the tag signature to predetermined tag signatures in a hash-table to determine a unique identifier of the drone.

Example 19 is a machine-implemented method for a drone collision avoidance, the method comprising: capturing, using a camera of a first drone, an encoded image projected by a second drone; extracting, using processing circuitry of the first drone, a trajectory of the second drone from the encoded image; comparing a trajectory of the first drone to the trajectory of the second drone; and altering the trajectory of the first drone based on the comparison of the trajectory of the first drone and the trajectory of the second drone.

In Example 20, the subject matter of Example 19 optionally includes wherein extracting, using processing circuitry of the first drone, a trajectory of the second drone from the encoded images comprises: detecting the encoded image in a field of view of the camera of the first drone; aligning the field of view with the encoded image; and decoding the encoded image.

In Example 21, the subject matter of any one or more of Examples 19-20 optionally include wherein extracting, using processing circuitry of the first drone, a trajectory of the second drone from the encoded images comprises: detecting a section of the encoded image in a field of view of the camera of the first drone; and decoding the encoded message based on the section of the encoded image detected by the camera.

In Example 22, the subject matter of any one or more of Examples 19-21 optionally include wherein extracting, using processing circuitry of the first drone, a trajectory of the second drone from the encoded images comprises: detecting the encoded image in a field of view of the camera of the first drone; decoding the encoded message based on a colored pattern of the encoded image.

In Example 23, the subject matter of any one or more of Examples 19-22 optionally include wherein altering the trajectory of the first drone based on the comparison of the trajectory of the first drone and the trajectory of the second drone comprises: determining a virtual force for the first drone based on the trajectory of the second drone; and accelerating the first drone based on the virtual force.

Example 24 is at least one non-transitory computer-readable medium for a drone collision avoidance comprising instructions which when executed by a machine, cause the machine to perform operations: detecting an encoded image related to a second drone in a field of view of a detection device of a first drone; decoding the image to receive information related to a trajectory of the second drone; and altering a trajectory of the first drone based on the information related to the trajectory of the second drone.

In Example 25, the subject matter of Example 24 optionally includes wherein the encoded image is one of a QR-code, CCTag, or colored pattern.

Example 26 is at least one machine-readable medium including instructions, which when executed by a machine, cause the machine to perform operations of any of the operations of Examples 19-23.

Example 27 is an apparatus comprising means for performing any of the operations of Examples 19-23.

Example 28 is at least one machine-readable medium including instructions that, when executed by processing circuitry, cause the processing circuitry to perform operations to implement of any of Examples 1-25.

Example 29 is an apparatus comprising means to implement of any of Examples 1-25.

Example 30 is a system to implement of any of Examples 1-25.

Example 31 is a method to implement of any of Examples 1-25.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed:

1. An apparatus for drone collision avoidance, the apparatus comprising:
  processing circuitry of a first drone on a flight trajectory to:
    extract information from a first encoded image, the first encoded image projected onto a surface by a second drone, and the first encoded image captured by a detection device with a field of view overlapping the first encoded image;

determine if a collision with the second drone will occur on the flight trajectory based on the extracted information; and alter the flight trajectory of the first drone to avoid the collision.

2. The apparatus of claim 1, wherein the first encoded image captured by the detection device is a Quick Response-code.

3. The apparatus of claim 1, wherein the first encoded image captured by the detection device is a Concentric Circle Tag (CCTag).

4. The apparatus of claim 1, wherein information is extracted from the encoded image captured by the detection device is based on the color of the first encoded image.

5. The apparatus of claim 1, wherein information is extracted from the first encoded image captured by the detection device is based on a pattern within the first encoded image captured by the detection device.

6. The apparatus of claim 1, wherein the processing circuitry is further configured to:

encode a second image with information related to the first drone to produce a second encoded image; and project with a camera the second encoded image with information related to the first drone onto the surface.

7. The apparatus of claim 6, wherein the information related to the first drone includes one of: drone velocity, drone trajectory, or drone flight path.

8. The apparatus of claim 6, wherein encoding the second encoded image with information related to the first drone comprises encoding redundant information into the second encoded image.

9. The apparatus of claim 6 wherein the surface is a ceiling.

10. The apparatus of claim 6, wherein the processing circuitry is further configured to:

determine a color of the surface; and modify the color of the second encoded image with information related to the first drone based on the color of the surface.

11. The apparatus of claim 6, wherein the processing circuitry is further configured to:

detect when the second encoded image with information related to the first drone overlaps with the first encoded image captured by the detection device; and modify the second encoded image with information related to the first drone based on the first encoded image captured by the detection device.

12. The apparatus of claim 1, wherein the second drone projects the first encoded image captured by the detection device and the processing circuitry is configured to:

determine a relative velocity of the second drone based on the first encoded image captured by the detection device;

determine a virtual force based on the relative velocity of the second drone; and change acceleration of the first drone based of the virtual force to alter the flight trajectory.

13. The apparatus of claim 12 wherein to determine if a collision with the second drone will occur the processing circuitry is configured to:

determine a location of the first drone based on the flight trajectory for a time point;

determine a location of the second drone based on the first encoded image captured by the detection device for the time point; and determine if the location of the first drone is the same as the location of the second drone at the time point.

14. The apparatus of claim 1, wherein the processing circuitry is further configured to:

align a camera of the first drone with the first encoded image captured by the detection device before extracting information from the first encoded image captured by the detection device.

15. The apparatus of claim 1 wherein extracting information from the first encoded image captured by the detection device comprises decoding the first encoded image captured by the detection device.

16. The apparatus of claim 15 wherein decoding the first encoded image captured by the detection device comprises processing the first encoded image captured by the detection device in lightness-red/green value-blue/yellow value (LAB) color space.

17. The apparatus of claim 16 wherein decoding the first encoded image captured by the detection device further comprises: determining a tag signature based on processing the first encoded image captured by the detection device in the LAB color space; and comparing the tag signature to predetermined tag signatures in a hash table to determine a unique identifier of the first drone.

18. A machine-implemented method for drone collision avoidance, the method comprising:

capturing, using a camera of a first drone, a first encoded image projected onto a surface by a second drone;

extracting, using processing circuitry of the first drone, a trajectory of the second drone from the first encoded image;

comparing a trajectory of the first drone to the trajectory of the second drone; and altering the trajectory of the first drone based on the comparison of the trajectory of the first drone and the trajectory of the second drone to avoid a collision.

19. The method of claim 18, wherein extracting, using processing circuitry of the first drone, the trajectory of the second drone from the first encoded image comprises: detecting the first encoded image in a field of view of the camera of the first drone; aligning the field of view with the first encoded image; and decoding the first encoded image.

20. The method of claim 18 wherein extracting, using processing circuitry of the first drone, the trajectory of the second drone from the first encoded image comprises: detecting a section of the first encoded image in a field of view of the camera of the first drone; and decoding the first encoded image based on the section of the first encoded image detected by the camera.

21. The method of claim 18 wherein extracting, using processing circuitry of the first drone, the trajectory of the second drone from the first encoded image comprises: detecting the first encoded image in a field of view of the camera of the first drone; decoding the first encoded message based on a colored pattern of the encoded image.

22. The method of claim 18 wherein altering the trajectory of the first drone based on the comparison of the trajectory of the first drone and the trajectory of the second drone comprises: determining a virtual force for the first drone based on the trajectory of the second drone; and accelerating the first drone based on the virtual force.

23. At least one non-transitory computer-readable medium for drone collision avoidance comprising instructions which when executed by a machine, cause the machine to perform operations:
- detecting a first encoded image related to a second drone in a field of view of a detection device of a first drone, the first encoded image projected onto a surface by the second drone;
- decoding the first encoded image to receive information related to a trajectory of the second drone; and
- altering a trajectory of the first drone based on the information related to the trajectory of the second drone to avoid a collision.

24. The at least one non-transitory computer-readable medium of claim 23, wherein the encoded image is one of: a Quick Response-code, Concentric Circle Tag (CCTag), or colored pattern.

\* \* \* \* \*